July 29, 1958     A. C. SAMPIETRO     2,845,587
POLYPHASE MOTOR CONTROL CIRCUIT
Filed May 15, 1956
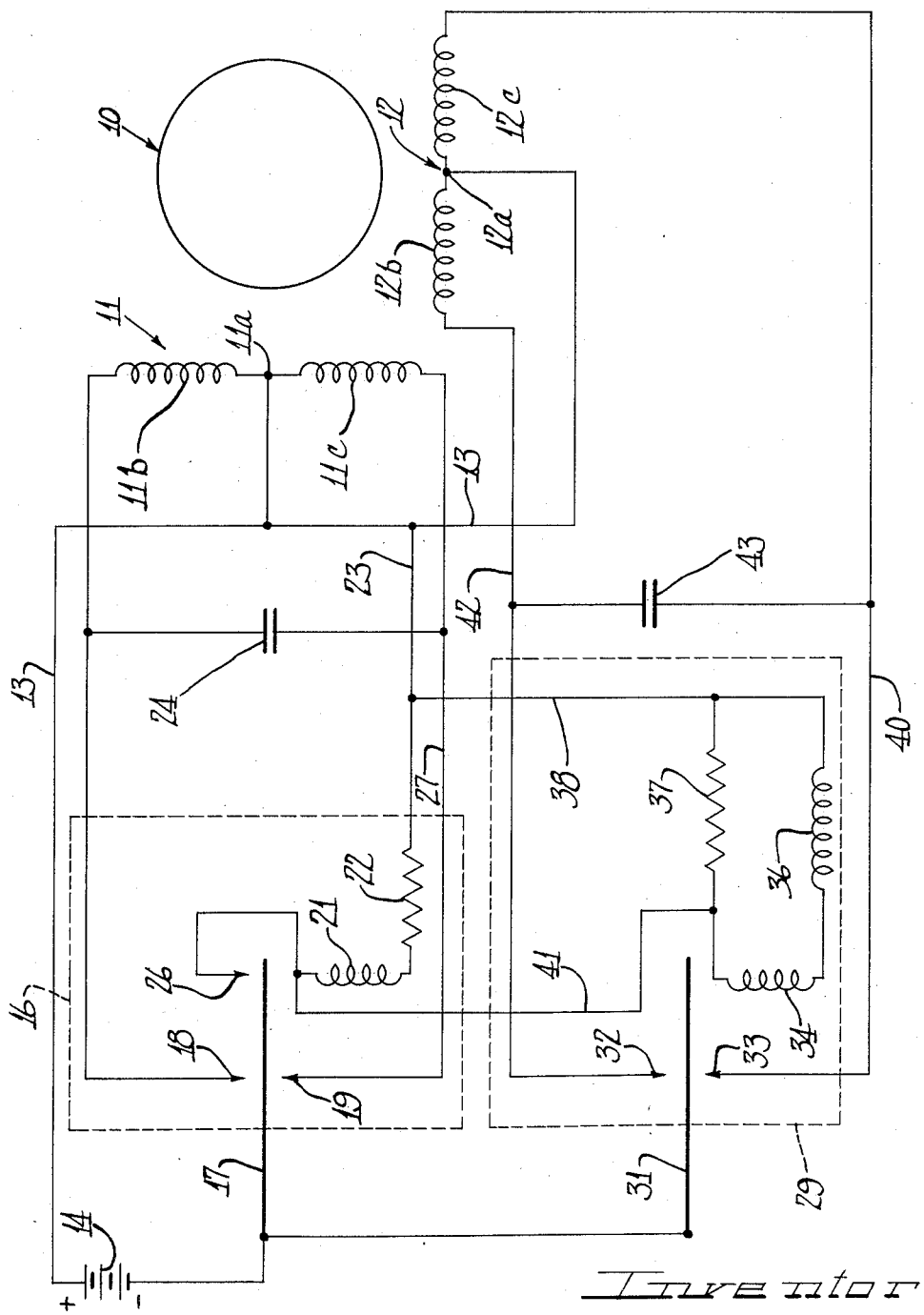
Inventor
Achilles C. Sampietro

United States Patent Office 2,845,587
Patented July 29, 1958

2,845,587
POLYPHASE MOTOR CONTROL CIRCUIT

Achilles C. Sampietro, Detroit, Mich., assignor to Thompson Products, Inc., Cleveland, Ohio, a corporation of Ohio Application May 15, 1956, Serial No. 585,117

5 Claims. (Cl. 318—171)

The present invention deals with improvements in energizing circuits for polyphase induction motors, and in particular, to polyphase motors which are energized ultimately from a source of direct current.

The circuit of the present invention has particular applicability to the energization of fuel pumps for internal combustion engines or the like.

Because of certain operating characteristics, it is more desirable to drive a fuel pump or the like by means of an alternating current motor rather than with a direct current motor. This immediately presents the problem of converting the direct current source such as the battery in the internal combustion engine assembly into a suitable alternating current source. In my copending application Serial No. 499,667, filed April 6, 1955, and entitled "Fuel Pump," I have described and claimed one such arrangement for energizing an alternating current motor associated with a fuel pump. While the type of circuit described and claimed in the aforementioned copending application is more than adequate under ordinary conditions, there are certain conditions such as exist under heavy load which cause the efficiency is characteristic of a single phase system generally. In addition to the decrease of efficiency, the system is limited in its current handling capacity because all of the current has to pass through a single pair of contact points so that the power input to the motor is cut down.

The present invention makes use of a polyphase system which does not suffer from the disadvantages noted above in connection with the single phase system. To achieve a polyphase energization of the windings of the polyphase induction motor, I have herein provided a relatively simple but highly effective motor control system for providing two or more out of phase, periodically varying voltages to energize the windings of the motor.

An object of the present invention is to provide an energizing system for polyphase induction motors which must derive their energy from a direct current source.

A further object of the invention is to provide an economical but highly effective motor control system for polyphase induction motors.

Still another object of the invention is to provide an improved energization circuit making use of a plurality of vibrators and a phase shifting network to provide the desired difference in phase between the voltage inputs to the energizing windings of a polyphase induction motor.

Other objects and features of the present invention will be apparent to those skilled in the art from the following description of the attached sheet of drawings which illustrates a preferred embodiment of the invention.

In the drawings the single figure constituting the drawings represents a somewhat schematic circuit diagram of the motor energization circuit as it is applied to a two phase system, but it will be realized that the principles of the present invention are equally applicable to polyphase systems having more than two energizing phases.

As shown in the drawings:

Reference numeral 10 indicates generally a rotor of a polyphase induction motor which is energized by a pair of energizing windings 11 and 12. Each of the windings 11 and 12 is center tapped as indicated at 11a and 12a respectively, and both the center tapped points are permanently connected by means of a conductor 13 to one side of a source of direct current such as a battery 14.

The winding 11, due to the center tap 11a is divided into a pair of windings 11b and 11c which are energized by a pulsating or periodically varying current from a vibrator circuit generally indicated at numeral 16 in the drawings. The vibrator 16 is the primary or "master" vibrator in the system since it controls the timing and energization of the entire circuit.

The vibrator circuit 16 includes a vibrating reed 17 composed of spring steel or the like and being arranged to alternately contact a pair of opposed contacts 18 and 19. A vibrator coil 21 is provided in the usual manner to control the displacement of the vibrating reed 17.

The vibrator coil 21 is connected in series with a resistor 22. The inductance-resistance network provided by the series combination of the coil 21 and the resistor 22 is connected by means of a conductor 23 to the center tap 11a of the motor winding 11.

The circuit also includes a capacitor 24 disposed across the contacts 18 and 19, and across the winding 11 to control transient voltages occurring in the circuit.

The portion of the circuit described thus far is more or less a conventional vibrator circuit to apply a periodically varying voltage from a D. C. source to an alternating current motor winding. Thus, when the reed 17 engages the contact 18 the circuit is completed through the winding 11b, the current flow passing from the center tap 11a through the winding 11b and the contact 18, into the negative terminal of the battery 14.

When the reed 17 strikes the contact 18, the vibrator coil 21 is also energized, as one end of the coil 21 is connected to an auxiliary contact 26 which is engaged by the reed 17 at or very nearly at the same time that the reed 17 engages the contact 18. This completes the circuit through the vibrator coil 21, the current passing through the conductor 23, the resistor 22, the vibrator coil 21, and the contact 26 back into the negative terminal of the battery 14. When the coil 21 is energized, the reed 17 is attracted away from its position in engagement with the contact 18 and strikes the lower contact 19. When this occurs, the current flow in the winding 11c is established in a direction opposite to that in the previous cycle, that is, the current flows from the center tap 11a through the winding 11c, through a conductor 27, contact 19, and into the negative terminal of the battery 14.

In engaging the contact 19, the reed 17 breaks the circuit energizing the vibrator coil 21 and the natural resilience of the vibrating reed 17 causes it to disengage from the contact 19 and again strike the contact 18, thereby completing the cycle of operation.

The auxiliary contact 26 is also arranged to control energization of a secondary or "slave" vibrator circuit generally indicated at numeral 29 in the drawings. The operation of the vibrator circuit 29 is arranged to introduce voltages across the windings 12b and 12c of the motor winding 12 which bear definite phase relationship to the corresponding voltages impressed across the windings 11b and 11c of the motor winding 11.

The secondary vibrator circuit 29 includes a second vibrating reed 31 which oscillates between a pair of opposed contacts 32 and 33. A vibrator coil 34 controls the movement of the reed 31 between its two contact positions.

The vibrator coil 34 is part of an inductance-resistance network including an inductance 36 and a resistance 37, the network being permanently connected to the conductor 23, and hence the positive side of the battery 14 by means of a conductor 38.

When the reed 17 contacts the auxiliary contact 26 in the primary vibrator circuit, the negative terminal of the battery 14 is connected to one end of the vibrator coil 34 by means of a conductor 41 so that a voltage exists across the inductance-resistance network defined by the vibrator coil 34, the inductance 36, and the resistance 37. When the vibrator coil 34 is energized, the reed 31 is attracted toward the contact 33 and, when contact is made, the winding 12c of the motor winding 12 is energized, since at that time, current can flow from the conductor 13 through the winding 12c, and back into the negative terminal of the battery 14 through a conductor 40, the contact 33, and the reed 31.

When current flows through the vibrator coil 34, the current across one half of the motor winding 12 is substantially out of phase with the current circulating at the same time across one half of the motor winding 11. This occurs because the ratio of inductance to resistance in the network comprising the coil 34, the inductance 36 and the resistance 37 is relatively high while the ratio of inductance to resistance provided by the network comprising the primary vibrator coil 21 and the resistance 22 is relatively low. Thus the buildup of current in the coil 34 to a point sufficient to actuate the reed 31 is delayed by the inductance 36, the values of inductance and resistance being chosen so that the closing of the reed 31 on the contact 33 occurs about 90° in the cycle later than the closing of the reed 17 on the contacts 18 and 26. For example, the inductive reactance to resistance ratio, at the operating frequency of the coil 21 between the inductance of the coil 21 and the resistor 22 may be on the order of $\frac{1}{10}$ to 1 while the inductive reactance of the combined coil 34 and the inductance 36 to the resistance 37 may be on the order of about 10 to 1. Accordingly, the voltage applied at one half of the motor winding 12 will be close to 90° (or 270°) out of phase with the voltage across one half of the winding 11 at the same time. This difference in phase between the respective windings of the motor produces a rotating magnetic field which initiates and maintains the rotation of the rotor 10 of the polyphase motor as is well known to those skilled in the art.

When the reed 17 of the primary vibrator circuit is no longer engaged with the auxiliary contact 26, the circuit to the secondary vibrator coil 34 is broken but a current continues to flow through the network of the coil 34, inductance 36 and the resistor 37. This residual current flow delays the deenergization of the coil 34 to the extent necessary to provide a predetermined delay in the movement of the reed 31. Ultimately the current in the coil 34 is no longer sufficient to hold the reed 31 and the normal resilience of the vibrator reed 31 causes the reed to come into contact with the contact 32, thereby connecting the negative terminal of the battery 14 through a conductor 42 to a winding 12b of the motor winding 12. In this position, the winding 12b is energized by the passage of current through the conductor 13, the winding 12b, the conductor 42, and the contact 32 back to the negative terminal of the battery 14. The secondary vibrator circuit is also provided with a capacitor 43 to control transient voltages in the circuit.

To summarize the operation of the device, the primary vibrator circuit 16 operates in the manner of an ordinary vibrator to apply a periodically varying voltage, usually approximating a square wave, to the motor winding 11. During one half of the cycle of operation of the primary vibrator 16, the auxiliary contact 26 which is energized by the movement of the vibrator reed 17 energizes the vibrator coil 34 of the secondary relay 29 to initiate operation of that vibrator circuit. While the vibrator coil 34 is energized, however, one half of the motor winding 12 is energized with an out of phase voltage to create the phase difference between the energizing voltages necessary for the operation of the polyphase induction motor.

In some cases, it may be desirable to include a capacitor in series or parallel with the coil 21 to achieve the proper phase difference.

It should also be evident that the invention is also applicable to three phase systems by suitable changes in the phasing arrangement.

It will be evident that various modifications can be made to the described embodiments without departing from the scope of the present invention.

I claim as my invention:

1. A polyphase motor control circuit for operating a polyphase motor from a direct current source comprising a polyphase motor having a plurality of energizing windings, a first vibrator circuit energizable by said direct current source and arranged to apply a periodically varying voltage across one of said energizing windings, a second vibrator whose actuation is controlled by said first vibrator arranged to energize another of said energizing windings, and phase shifting means arranged to shift the phase of the current flowing in the circuit of said second vibrator to apply a voltage across said other winding which is out of phase with the voltage applied to the first named winding by said first vibrator circuit.

2. A polyphase motor control circuit for operating a polyphase motor from a direct current source comprising a polyphase motor having a plurality of energizing windings, a first vibrator circuit energizable by said direct current source and in which the current flow is controlled by a reactance-resistance network having a relatively low reactance to resistance ratio, said first vibrator circuit being arranged to apply a periodically varying voltage across one of said energizing windings, and a second vibrator circuit controlled by said first vibrator circuit and in which the current flow is controlled by a reactance-resistance network having a relatively high inductance to resistance ratio, said second vibrator circuit being connected across another of said energizing windings to apply a voltage across its associated winding having a substantial phase difference with respect to the voltage applied to the first named winding by said first vibrator circuit.

3. A polyphase motor control circuit for operating a polyphase motor from a direct current source comprising a polyphase motor having a plurality of energizing windings, a first vibrator circuit energizable by said direct current source in which the current flow is controlled by an inductance-resistance network having a relatively low inductance to resistance ratio, said first vibrator circuit being arranged to apply a periodically varying voltage across one of said energizing windings, and a second vibrator circuit actuated by said first vibrator circuit and in which the current flow is controlled by an inductance-resistance network having a relatively high inductance to resistance ratio, said second vibrator circuit being connected across another of said energizing windings to apply a voltage across its associated winding having a substantial phase difference with respect to the voltage applied to the first named winding by said first vibrator circuit.

4. A polyphase motor control circuit for operating a polyphase motor from a direct current source comprising, a polyphase motor having a pair of center tapped energizing windings, a source of direct current potential, means connecting one side of said direct current source to the center tap of each of said windings, a first vibrator circuit connected across one of said windings and operated by said direct current source to connect the other side of said source alternately to opposed ends of one of said windings, a second vibrator circuit connected across another of said center tapped windings, a phase shifting network energized by operation of said second vibrator circuit to introduce a phase difference between the current and voltage in said second vibrator circuit, an auxiliary contact in said first vibrator circuit arranged to apply said other side of said direct current source to said second vibrator circuit during one half of the cycle of operation of said first vibrator circuit, whereby operation of said first vibrator circuit is effective to apply an alternating voltage across said one motor winding and operation of said second vibrator circuit is effective to apply an alternating voltage to said other motor winding in out of phase relation to the voltage applied to said one motor winding by said first vibrator circuit.

5. A polyphase motor control circuit for operating a polyphase motor from a direct current source comprising a polyphase motor having a plurality of energizing windings, a first vibrator circuit arranged to be energized from said source and connected across one of said windings to apply an alternating potential across said one winding, a second vibrator circuit arranged to be energized from said source and connected across another of said windings to apply an alternating potential across said other winding, and means providing a phase difference between the voltages applied to said windings by said vibrator circuit.

No references cited.